United States Patent
Mohammed et al.

(10) Patent No.: US 11,475,445 B2
(45) Date of Patent: Oct. 18, 2022

(54) SECURE AUTHENTICATION SYSTEM WITH TOKEN SERVICE

(71) Applicant: Visa International Service Association, San Francisco, CA (US)

(72) Inventors: Sayeed Mohammed, Foster City, CA (US); Anjana Neera Surin, Foster City, CA (US); Ansar Ansari, San Ramon, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 260 days.

(21) Appl. No.: 16/396,325

(22) Filed: Apr. 26, 2019

(65) Prior Publication Data
US 2019/0333055 A1 Oct. 31, 2019

Related U.S. Application Data

(60) Provisional application No. 62/663,559, filed on Apr. 27, 2018.

(51) Int. Cl.
*G06Q 20/38* (2012.01)
*H04L 9/40* (2022.01)
(Continued)

(52) U.S. Cl.
CPC .......... *G06Q 20/385* (2013.01); *G06Q 20/36* (2013.01); *G06Q 20/4014* (2013.01);
(Continued)

(58) Field of Classification Search
CPC .. G06Q 20/385; G06Q 20/3674; G06Q 20/40; G06Q 30/0601; H04L 63/062
See application file for complete search history.

(56) References Cited

U.S. PATENT DOCUMENTS

| | | | |
|---|---|---|---|
| 8,533,860 B1 * | 9/2013 | Grecia | H04L 63/083 726/29 |
| 10,361,856 B2 * | 7/2019 | Cassin | H04L 63/062 |
| 2003/0200184 A1 * | 10/2003 | Dominguez | G07F 7/10 705/78 |

FOREIGN PATENT DOCUMENTS

WO    WO-2010129357 A2 *  11/2010   ........... G06Q 20/425

OTHER PUBLICATIONS

Levitin, Pandora's Digital Box: The Promise and Perils of Digital Wallets, American Law Register (Year: 2018).*

(Continued)

*Primary Examiner* — Richard C Weisberger
(74) *Attorney, Agent, or Firm* — Kilpatrick Townsend & Stockton LLP (57) ABSTRACT

An enhanced authentication system is described. One embodiment of the invention is directed to a method comprising: receiving, by a token service computer and from an initiating computer, a first authentication request message including verification method data and a token; transmitting, by the token service computer, a second authentication request message comprising the token and the verification method data to an access control server; receiving, by the token service computer from the access control server, an authentication response message comprising the token and a user authentication verification value; and transmitting, by the token service computer to the initiating computer, the authentication response message comprising the token, the user authentication verification value, and a token authentication verification value.

17 Claims, 5 Drawing Sheets

(51) Int. Cl.
*G06Q 20/40* (2012.01)
*H04W 12/06* (2021.01)
*G06Q 20/36* (2012.01)
*H04L 9/32* (2006.01)

(52) U.S. Cl.
CPC ............ *H04L 9/3234* (2013.01); *H04L 63/08* (2013.01); *H04W 12/06* (2013.01)

(56) References Cited

OTHER PUBLICATIONS

Tran, Mobile Payment Security, A Case Study of Digital Wallet Momo, Bachelor Thesis (Year: 2020).*

* cited by examiner

SECURE AUTHENTICATION SYSTEM WITH TOKEN SERVICE

CROSS-REFERENCE TO RELATED APPLICATIONS

This non-provisional application claims priority to U.S. Patent Application No. 62/663,559, filed on Apr. 27, 2018, the disclosure of which is herein incorporated by reference in its entirety for all purposes.

BACKGROUND

Consumers may conduct online payment transactions using devices such as mobile devices. For example, a consumer may download a merchant application and select some items to purchase. Then, to conduct the payment transaction, the consumer may enter payment information using a physical or on-screen keyboard. However, the manual entry of payment information to merchant applications is often redundant, as the consumer may already have payment information stored in a secure storage medium of the device. Further, the manual entry of payment information may introduce security risks such as a vulnerability to eavesdropping. Payment credentials stored on a mobile device are sensitive and merchant applications on the mobile device may be open to hacking, spoofing, or other security threats.

Traditional remote transactions have a higher risk of fraud because a consumer is not present at a merchant or service provider for verification that the payment credentials have not been stolen or intercepted and are not being used by a malicious third party. Tokens may be used as substitutes for real payment credentials to conduct transactions such as payment transactions. If a token is stolen by unauthorized persons the real credentials are not exposed. When using tokens however a number of steps are required to perform the authentication process before a transaction can proceed. When millions of transactions are taking place the burn to computing resources in a computer network can be significant, especially for computer networks that rely on authentication and tokenization processes to ensure secure transaction processing. Improved authentication systems and methods are needed.

SUMMARY

Embodiments of the disclosure are directed to methods and systems for authentication systems associated with transactions. Some embodiments of the invention include a method including receiving, by a token service computer and from an initiating computer, a first authentication request message including verification method data and a token; transmitting, by the token service computer, a second authentication request message comprising the token and the verification method data to an access control server; receiving, by the token service computer from the access control server, an authentication response message comprising the token and a user authentication verification value (e.g., a cardholder authentication verification value); and transmitting, by the token service computer to the initiating computer, the authentication response message comprising the token, the user authentication verification value, and a token authentication verification value.

In some embodiments, the initiating computer is a digital wallet computer or a resource provider computer. In some embodiments, the initiating computer is a resource provider computer or a digital wallet computer, and the token service computer is in communication with a transaction processing computer, wherein the method further includes receiving, by the transaction processing computer and from the resource provider computer, an authorization request message comprising a transaction amount, the token, and the token authentication verification value; validating, by the transaction processing computer, the user authentication verification value and the token authentication verification value; modifying, the authorization request message to include a real account identifier associated with the token; transmitting, by the transaction processing computer, the authorization request message comprising the real account identifier to an authorizing entity computer for authorization; receiving, by the transaction processing computer and from the authorizing entity computer, an authorization response message; and transmitting, by the transaction processing computer, the authorization response message to the resource provider computer.

In some embodiments, the verification method data includes authentication data obtained from a user device interacting with the initiating computer. In some embodiments, the access control server is configured to authenticate the user device and generate the user authentication verification value based at least in part on the verification method data. In some embodiments, the token service computer receives user specific data, device data, or application data from a digital wallet computer or the initiating computer via a user device associated with the first authentication request message. In some embodiments, the access control server authenticates the user device and generates the user authentication verification value based at least in part on one or more of the user specific data, the device data, or the application data.

In some embodiments, the token service computer is configured to combine the token authentication verification value and the user authentication verification value into a cryptogram prior to transmitting the authentication response message to the initiating computer, the authentication response message further comprising the cryptogram. In some embodiments, the access control server declines to authenticate the second authentication request message based at least in part on an absence of an electronic commerce indicator included in the second authentication request message. In some embodiments, the access control server is configured to generate and transmit a challenge request message to a user device associated with the first authentication request message or a digital wallet computer in response to receiving the second authentication request message. In some embodiments, the access control server authenticates the user device and generates the user authentication verification value based at least in part on a challenge response message received from the user device or the digital wallet computer.

Embodiments of the invention are further directed to a computer system including a processor; and a memory element including instructions that, when executed with the processor, cause the system to at least: receive, from an initiating computer, a first authentication request message including verification method data and a token; transmit a second authentication request message comprising the token and the verification method data to an access control server; receive, from the access control server, an authentication response message comprising the token and a user authentication verification value; and transmit, to the initiating computer, the authentication response message comprising the token, the user authentication verification value, and a token authentication verification value.

Embodiments of the invention are further directed to a computer-implemented method including obtaining, by a digital wallet computer, verification method data from a user device in response to a transaction conducted via the user device and an initiating computer; generating, by the digital wallet computer, an authentication request message including the verification method data and a token; transmitting, by the digital wallet computer and to an access control server, the authentication request message, the access control server configured to utilize the verification method data to authenticate the transaction; receiving, by the digital wallet computer, an authentication response message comprising the token and a user authentication verification value; and transmitting, by the digital wallet computer and to the initiating computer, the authentication response message comprising the token, the token authentication verification value, and the user authentication verification value.

In embodiments, the token authentication verification value and the user authentication verification value are embodied in form of a single cryptogram when they are received by the digital wallet computer.

These, and other embodiments of the invention, are discussed in further detail below.

DETAILED DESCRIPTION

Embodiments of the invention may provide exemplary systems, devices, and methods for conducting a transaction and related activities. Although reference may be made to such transactions in the examples provided below, embodiments are not so limited. That is, the systems, methods, and apparatuses described herein may be utilized for any suitable purpose. Embodiments of the invention include systems and methods for improving authentication techniques during a transaction process. In some embodiments, a digital wallet application (application) of a user device may initiate an authentication request for a transaction conducted utilizing the user device. In embodiments, the user device may also include a resource provider application (browser application) associated with a resource provider. A user may interact with their user device to conduct an e-commerce transaction with a resource provider via the resource provider application. The resource provider application and/or the digital wallet application may prompt the user to conduct a digital wallet transaction.

In embodiments, the authentication request may be generated by the digital wallet application (or a backend server affiliated with the digital wallet application) and include verification method data and a token. In accordance with at least one embodiment, the digital wallet application may communicate, via a digital wallet computer, with a token service computer that further communicates with a directory server and access control server to authenticate the user involved in the transaction using verification method data or other available data such as transaction data. The access control server may authenticate the user or user device and generate a user authentication verification value such as a cardholder authentication verification value which represents that authentication of the user or user device has been performed by the access control server. In embodiments, the token service computer may receive an authentication response from the access control server that includes the token, an electronic commerce indicator, and the cardholder authentication verification value. In accordance with at least one embodiment, the token service computer may generate a token authentication verification value associated with the token of the authentication request message. In embodiments, the token service computer may combine the token authentication verification value and the cardholder authentication verification value into a single cryptogram. The cryptogram may be utilized by digital wallet computers and/or resource provider computers that are not configured to receive and process many different authentication verification data messages. The token service computer may transmit the authentication response including the cardholder authentication verification value, the token authentication verification value, and the token to the digital wallet computer and/or the resource provider computer, so that they may continue with transaction processing.

Embodiments of the invention provide several advantages. For example, in some embodiments a user does not have to enter any sensitive account information into any device including the user device during a transaction. In embodiments, the user can initiate and conduct a transaction with the user device without presenting or physically interacting with a card that includes relevant payment account information as is conventionally required to conduct an e-commerce transaction. Instead, a user may utilize a digital wallet application of their user device to conduct a transaction with a remote resource provider computer or via a resource provider application of the user device. The user device and digital wallet application may interact or otherwise communicate with appropriate hardware or software components (e.g., secure data element) of the user device to generate an authentication request that includes both a cardholder authentication verification value generated by the access control server and a token authentication verification value generated by the token service computer.

During the authentication of the transaction the digital wallet application or the digital wallet computer that is communication with the digital wallet application can request a token to utilize in a transaction instead of primary account information or number (PAN), thereby removing the need for the user to manually input such sensitive information. Moreover, the digital wallet application may request a user verification (e.g., cardholder verification) from a user associated with the user device such as by requesting a personal identification number (PIN), biometric data, or several challenge requests and responses. The digital wallet application can include the particular cardholder verification method or data utilized to verify the user in the authentication request that is provided to the access control server. In embodiments, the access control server may utilize the cardholder verification data to authenticate the user without having to separately request additional authentication data from the user thereby prolonging the authentication process and ultimately the transaction process. The network and system architecture described herein provides for reduced message generation and transmittal between components (e.g., the resource provider computer, the digital wallet computer, the token service computer, etc.,) while also providing for increased transaction processing speed by minimizing the data requested of a user.

Additional advantages can be achieved by combining the cardholder authentication verification value and the token authentication verification value into a cryptogram as older systems or systems unable to support different cryptograms can still utilize the verification data points to provide a more secure authentication system for conducting a transaction. For example, some resource providers need not change their infrastructure or change protocols to support receiving and processing of two different cryptograms, one for authentication via an issuer (the access control server) and one for authentication using a token (the token service computer). The cardholder verification method data can be provided directly to the token service computer and access control server without having to be transmitted to the resource provider computer, thereby reducing the number of parties that can access the data and introduce potential fraud.

Prior to discussing embodiments of the invention, description of some terms may be helpful in understanding embodiments of the invention.

An "authentication request message" may be an electronic message that is sent to one or more computing devices to request authentication for a transaction. In some embodiments, the authentication request message may be an electronic message that is sent to a payment processing network and/or an issuer of a payment account to request authentication for a payment transaction. In some implementations, the authentication request message may include cardholder, merchant, and transaction-specific information (e.g., a token or PAN associated with the cardholder). The authentication request message according to some embodiments may comply with HTTP standards, which may be defined according to the HTTP messaging specification, and may be an HTTP "GET" or "POST" message.

An "authentication response message" may be an electronic message reply to an authentication request. In some embodiments, the authentication response message may be generated by an issuing financial institution (i.e. issuer) or a payment processing network. In some implementations, the authentication response message may include cardholder, merchant, and transaction-specific information. The authentication response message may include an authentication result (which may also be known as an authentication determination), which may be a value that an account issuing bank returns in response to an authentication request in an electronic message (either directly or through the payment processing network) to a merchant's access device (e.g., point of sale terminal) that indicates authentication of a user conducting a transaction.

An "authorization request message" may be an electronic message that requests authorization for a transaction. In some embodiments, it is sent to a payment processing network and/or an issuer of a payment account to request authorization for a payment transaction. An authorization request message according to some embodiments may comply with ISO 8583, which is a standard for systems that exchange electronic transaction information associated with a payment made by a consumer using a payment device or a payment account. An authorization request message may also comprise additional data elements corresponding to "identification information" including, for example, a service code, a CVV (card verification value), a dCVV (dynamic card verification value), an expiration date, etc. An authorization request message may also comprise "transaction data," such as any information associated with a current transaction (e.g., the transaction amount, merchant identifier, merchant location, etc.), as well as any other information that may be utilized in determining whether to identify and/or authorize a payment transaction.

An "authorization response message" may be reply to an authorization request message. In some embodiments, an authorization response message may be an electronic message reply to an authorization request message generated by an issuing financial institution (i.e. issuer) or a payment processing network. An authorization response message according to some embodiments may comply with ISO 8583, which is a standard for systems that exchange electronic transaction information associated with a payment made by a consumer using a payment device or a payment account. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant.

A "server computer" may typically be a powerful computer or cluster of computers. For example, the server computer can be a large mainframe, a minicomputer cluster, or a group of servers functioning as a unit. In one example, a server computer may be a database server coupled to a Web server. The server computer may be associated with an entity such as a merchant, payment processing network, a wallet provider, a merchant, an authentication cloud, an acquirer, or an issuer.

A "computing device" may be any suitable electronic device that can process and communicate information to other electronic devices. The computing device may include a processor and a computer readable medium coupled to the processor, the computer readable medium comprising code, executable by the processor. The computing device may also each include an external communication interface for communicating with each other and other entities. A mobile device, a cardholder device, a user device, a consumer device, and a server computing device may be exemplary types of computing devices.

An "authorization computer" may include any system involved in authorization of a transaction. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource. In some cases, the authorization computer may be a content provider server computer associated with a content providing entity, which manages one or more resources that may be accessed by the user. The authorization computer may be known as an authorizing entity computer. The authorization computer may include an "access control server" that may be configured to authenticate a user.

An "access control server" may be configured to authenticate a user. An access control server can receive authentication request messages. An access control server may be configured to transmit challenge request messages and receive challenge responses messages from a user computing device (or application operating thereon) or a digital wallet computer. In some embodiments, the access control server may be configured to verify the enrollment of an account in a secure authentication program, perform a risks analysis to determine whether the transaction should be authenticated, and return an authentication response message to a resource provider computer (e.g., via a directory server, a token service computer, and a digital wallet computer).

A "directory server computer" may include a server that can perform message routing. In some embodiments, the directory server computer may be capable of receiving messages (e.g., authentication request messages, authentication response messages, etc.,) determining the appropriate destination computer for the received messages, and routing the received messages to the appropriate destination computer (e.g., an access control server computer or token service computer). In some embodiments, the directory server computer may include or be associated with a database containing routing tables that may be used to determine an appropriate authorizing entity computer associated with an account identifier (e.g., a bank identification number). In some embodiments, the directory server computer may be further configured to perform an enrollment verification process for an account identifier and a risk analysis process. The directory server computer may be known as a "directory server."

A "transaction processing computer" may include a server computer used for transaction processing. In some embodiments, the transaction processing computer may be coupled to a database and may include any hardware, software, other logic, or combination of the preceding for servicing the requests from one or more client computers or user devices. The transaction processing computer may comprise one or more computational apparatuses and may use any of a variety of computing structures, arrangements, and compilations for servicing the requests from one or more client computers or user devices. In some embodiments, the transaction processing computer may operate multiple server computers. In such embodiments, each server computer may be configured to process a transaction for a given region or handles transactions of a specific type based on transaction data.

The transaction processing computer may include data processing subsystems, networks, and operations used to support and deliver authorization services, exception file services, and clearing and settlement services. An exemplary transaction processing computer may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The transaction processing computer may use any suitable wired or wireless network including the Internet.

The transaction processing computer may process transaction-related messages (e.g., authorization request messages and authorization response messages) and determine the appropriate destination computer (e.g., issuer computer/authorizing entity computer) for the transaction-related messages. In some embodiments, the transaction processing computer may authorization transactions on behalf of an issuer. The transaction processing computer may also handle and/or facilitate the clearing and settlement of financial transactions.

A "transaction request message" may be an electronic message that indicates that the user has initiated a transaction with a resource provider. A transaction request message may include transaction data associated with the transaction.

A "transaction response message" may be an electronic message that is used to respond to a transaction request message. In some embodiments, the transaction response message may indicate that the transaction associated with a transaction request message was successful or unsuccessful.

"Transaction data" may include data related to a transaction. Transaction data may include data for a specific transaction, including items purchased, item prices, total cost, shipping address, billing address, payment methods (e.g., a primary account number, card number, etc.), resource provider data (e.g., merchant data), user-specific data, user computing device data, etc.

"User computing device data" may include data associated with a user computing device. User computing device data may refer to data regarding a portable computing device, such as a computer or mobile phone. Examples of user computing device data may include unique device identifiers for a computer or mobile phone, an IP address, SIM card data, application data, mobile application data, browser data, and device make and model data. User computing device data may also include the device's MSISDN, or Mobile Subscriber Integrated Services Digital Network Number, which is a number that uniquely identifies a subscription in a mobile network.

"User-specific data" may include data specific to a user. User-specific data may include a name, mailing address, shipping address, billing address, phone number, payment account number, date of birth, marital status, income, social security number, demographic data, etc. In some embodiments, user-specific data may also include consumer preferences, notification methods, and prior transaction history.

A "challenge request message" may include a message sent as part of an authentication process for a user and/or user computing device. In some embodiments, the challenge request message may contain a request for the user to submit pre-established authentication data in order to authenticate an account or payment device. The challenge request message may be generated and transmitted (e.g., by an access control server) prior to authenticating the account or payment device.

A "challenge response message" may include a message sent as part of an authentication process for a user and/or user computing device. In some embodiments, the challenge response message may be transmitted from a user computing device to an access control server. The challenge response message may contain authentication data in order to authenticate an account or payment device.

"Authentication data" may include any data suitable for authenticating a user or user device. Authentication data may be initially obtained from a user or a user device that is operated by the user. Examples of authentication data obtained from a user may include PINs (personal identification numbers), passwords, etc. Examples of authentication data that may be obtained from a device may include device serial numbers, hardware secure element identifiers, device fingerprints, biometric information of the user, phone numbers, IMEI numbers, etc.

"A resource providing entity" or "resource provider" may be an entity that may make resources available to a user. Examples of resource providing entities include merchants, vendors, suppliers, owners, traders, and the like. In some embodiments, such entities may be a single individual, small groups of individuals, or larger groups of individuals (e.g., companies). Resource providing entities may be associated with one or more physical locations (e.g., supermarkets, malls, stores, etc.) and online platforms (e.g., mobile applications, e-commerce websites, online companies, etc.). In some embodiments, resource providing entities may make available physical items (e.g., goods, products, etc.) to the user. In other embodiments, resource providing entities may make available digital resources (e.g., electronic documents, electronic files, etc.) to the user. In other embodiments, resource providing entities may manage access to certain resources (e.g., password, code, etc.) by the user.

A "resource provider computing device" may include any system associated with a resource providing entity. In some embodiments, the resource provider computing device may handle functionality of a mobile application and/or a website associated with the resource providing entity from which a user may conduct an online transaction. The resource provider computing device may also be known as the resource provider computer.

A "risk assessment value" may indicate a risk analysis result. The risk assessment value may be represented by one or more of a number (e.g., numerical score), a letter, alphanumeric value, a level, a threshold, a range, a set of attribute-value pairs, or other suitable values. In some embodiments, the risk assessment value may be generated by a server computing device, which may be associated with a payment processor or issuer computer. In some implementations, the risk assessment value may be determined based on information included in one or more messages (e.g., authentication message, etc.) sent to the server computing device. In embodiments, the risk assessment value may be determined by the access control server.

A "device identifier" may be any suitable indicator including information that may be used to identify a computing device. The computing device may be associated with multiple device identifiers. For example, exemplary device identifiers may include a manufacturer identifier, account identifier, IP address, and other suitable identifiers. In some embodiments, one or more device identifiers may be included in a HTTP header of a HTTP message.

A "feature identifier" may be any suitable indicator including information about one or more characteristics of a computing device. The feature identifier may be of any length and may include numbers or alphanumeric characters that may be mapped to certain characteristics. In some embodiments, the one or more characteristics may include technological capabilities and configurations of the computing device. For example, the feature identifier may indicate whether cookies are enabled, whether a Flash multimedia player is installed and enabled, and whether JavaScript is enabled on the computing device.

A "message format" may be any data format that makes up a message. In some cases, the message format may comprise certain messaging standard. For example, a message formatted according to the message format may be formatted according to a certain messaging standard. In some embodiments, the message format may enable unique or system-specific fields or data elements in the message.

A "Hypertext Transfer Protocol (HTTP) messaging standard" may be a protocol defining how messages are formatted and transmitted over the World Wide Web. HTTP messages may include "GET" or "POST" messages, where "GET" messages may request data from a specified resource and "POST" messages may submit data to a specific resource for processing. In some embodiments, a HTTP message may comprise a request line including method, URL, and version fields, header lines, and an entity body. HTTP messages based on the standard may include messages that contain HTML, JavaScript, JSON, AJAX, XML, etc. In some cases, messages sent to and from a computing device of a user may be formatted according to a HTTP standard.

A "communication device" may comprise any suitable electronic device that may be operated by a user, which may also provide remote communication capabilities to a network. A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "digital wallet" can include an electronic device that allows an individual to conduct electronic commerce transactions. A digital wallet may store user profile information, payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like. A digital wallet may be designed to streamline the purchase and payment process. A digital wallet may allow the user to load one or more payment cards onto the digital wallet so as to make a payment without having to enter an account number or present a physical card. A digital wallet may also be known as an application or digital wallet application. In embodiments, the digital wallet may be in communication with a digital wallet computer.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" is a process by which data is replaced with substitute data. For example, a payment account identifier (e.g., a primary account number (PAN)) may be tokenized by replacing the primary account identifier with a substitute number (e.g. a token) that may be associated with the payment account identifier. Further, tokenization may be applied to any other information that may be replaced with a substitute value (i.e., token). Tokenization enhances transaction efficiency and security.

A "token issuer," token provider," "token service system," or "token service computer" can include a system that services tokens. In some embodiments, a token service system can facilitate requesting, determining (e.g., generating) and/or issuing tokens, as well as maintaining an established mapping of tokens to primary account numbers (PANs) in a repository (e.g. token vault). In some embodiments, the token service system may establish a token assurance level for a given token to indicate the confidence level of the token to PAN binding. The token service system may include or be in communication with a token vault where the generated tokens are stored. The token service system may support token processing of payment transactions submitted using tokens by de-tokenizing the tokens to obtain the actual PANs. In some embodiments, a token service system may include a tokenization computer alone, or in combination with other computers such as a transaction processing network computer. Various entities of a tokenization ecosystem may assume the roles of the token service provider. For example, payment networks and issuers or their agents may become the token service provider by implementing the token services according to embodiments of the present invention.

A "token domain" may indicate an area and/or circumstance in which a token can be used. Examples of token domains may include, but are not limited to, payment channels (e.g., e-commerce, physical point of sale, etc.), POS entry modes (e.g., contactless, magnetic stripe, etc.), and merchant identifiers to uniquely identify where the token can be used. A set of parameters (i.e. token domain restriction controls) may be established as part of token issuance by the token service provider that may allow for enforcing appropriate usage of the token in payment transactions. For example, the token domain restriction controls may restrict the use of the token with particular presentment modes, such as contactless or e-commerce presentment modes. In some embodiments, the token domain restriction controls may restrict the use of the token at a particular merchant that can be uniquely identified. Some exemplary token domain restriction controls may require the verification of the presence of a token cryptogram that is unique to a given transaction. In some embodiments, a token domain can be associated with a token requestor. A "token" cryptogram may include a token authentication verification value (TAVV) associated with a token. A token cryptogram may be a string of numbers, letters, or any other suitable characters, of any suitable length. In some embodiments, a token cryptogram may include encrypted token data associated with a token (e.g., a token domain, a token expiry date, etc.). For example, a token cryptogram may be used to validate that the token is being used within a token domain and/or by a token expiry date associated with the token.

A "token expiry date" may refer to the expiration date/time of the token. The token expiry date may be passed among the entities of the tokenization ecosystem during transaction processing to ensure interoperability. The token expiration date may be a numeric value (e.g. a 4-digit numeric value). In some embodiments, the token expiry date can be expressed as an time duration as measured from the time of issuance.

A "token request message" may be an electronic message for requesting a token. A token request message may include information usable for identifying a payment account or digital wallet, and/or information for generating a payment token. For example, a token request message may include payment credentials, mobile device identification information (e.g. a phone number or MSISDN), a digital wallet identifier, information identifying a tokenization service provider, a merchant identifier, a cryptogram, and/or any other suitable information. Information included in a token request message can be encrypted (e.g., with an issuer-specific key).

A "token response message" may be a message that responds to a token request. A token response message may include an indication that a token request was approved or denied. A token response message may also include a payment token, mobile device identification information (e.g. a phone number or MSISDN), a digital wallet identifier, information identifying a tokenization service provider, a merchant identifier, a cryptogram, and/or any other suitable information. Information included in a token response message can be encrypted (e.g., with an issuer-specific key).

A "token requestor identifier" may include any characters, numerals, or other identifiers associated with an entity associated with a network token system. For example, a token requestor identifier may be associated with an entity that is registered with the network token system. In some embodiments, a unique token requestor identifier may be assigned for each domain for a token request associated with the same token requestor. For example, a token requestor identifier can identify a pairing of a token requestor (e.g., a mobile device, a mobile wallet provider, etc.) with a token domain (e.g., e-commerce, contactless, etc.). A token requestor identifier may include any format or type of information. For example, in one embodiment, the token requestor identifier may include a numerical value such as a ten digit or an eleven digit number (e.g., 4678012345).

A "user" may include an individual. In some embodiments, a user may be associated with one or more personal accounts and/or mobile devices. The user may also be referred to as a cardholder, account holder, or consumer in some embodiments.

A "user device" may be any suitable electronic device that can process and communicate information to other electronic devices. The user device may include a processor and a computer readable medium coupled to the processor, the computer readable medium comprising code, executable by the processor. The user device may also each include an external communication interface for communicating with each other and other entities. Examples of user devices may include a communication device such as a mobile device, a laptop or desktop computer, a wearable device, a vehicle with remote communication capabilities, etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc.

An "issuer" may typically refer to a business entity (e.g., a bank) that maintains an account for a user. An issuer may also issue payment credentials stored on a user device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

A "secure authentication system" may include one or more computing devices (e.g., servers) that provide secure authentication of users with respect to transactions conducted between two entities (e.g., users and resource providers).

A "verification value" may be a value or a token that indicates successful authentication. A "verification value" may be in the form of a digital signature. The digital signature may be a cryptogram that is generated after a computer such as an access control server signs transaction data with a key (e.g., a private or a symmetric key). An example of a verification value is a cardholder authentication verification value, or CAVV, that may be provided by an issuer associated with a payment device upon authentication of the payment device. The verification value may be used in processing a payment authorization for a financial transaction as proof that an issuer or other authorizing entity authenticated a user.

"Verification method data" may include any data that may be used to authenticate or validate a user or a device. Verification method data may include authentication data. In embodiments, verification method data may indicate a specific process or data that is provided by a user to a digital wallet of a user device for authenticating the user or the device with the digital wallet. In some embodiments, a digital wallet of a user device may request that a user interacting with the user device or request that the user device itself authenticate itself with the digital wallet computer or the digital wallet prior to processing an authentication request for a transaction. Examples of data provided by a user and included in verification method data may include PINs (personal identification numbers), passwords, etc. Examples of verification method data that may be obtained from a device may include device serial numbers, hardware secure element identifiers, device fingerprints, biometric information of the user, phone numbers, IMEI numbers, etc. Verification method data may also include data indicating that a user device or communication device has verified a particular user, such as verifying that a user's inputted PIN or biometric is valid when compared to a stored PIN or biometric.

Figure 1:
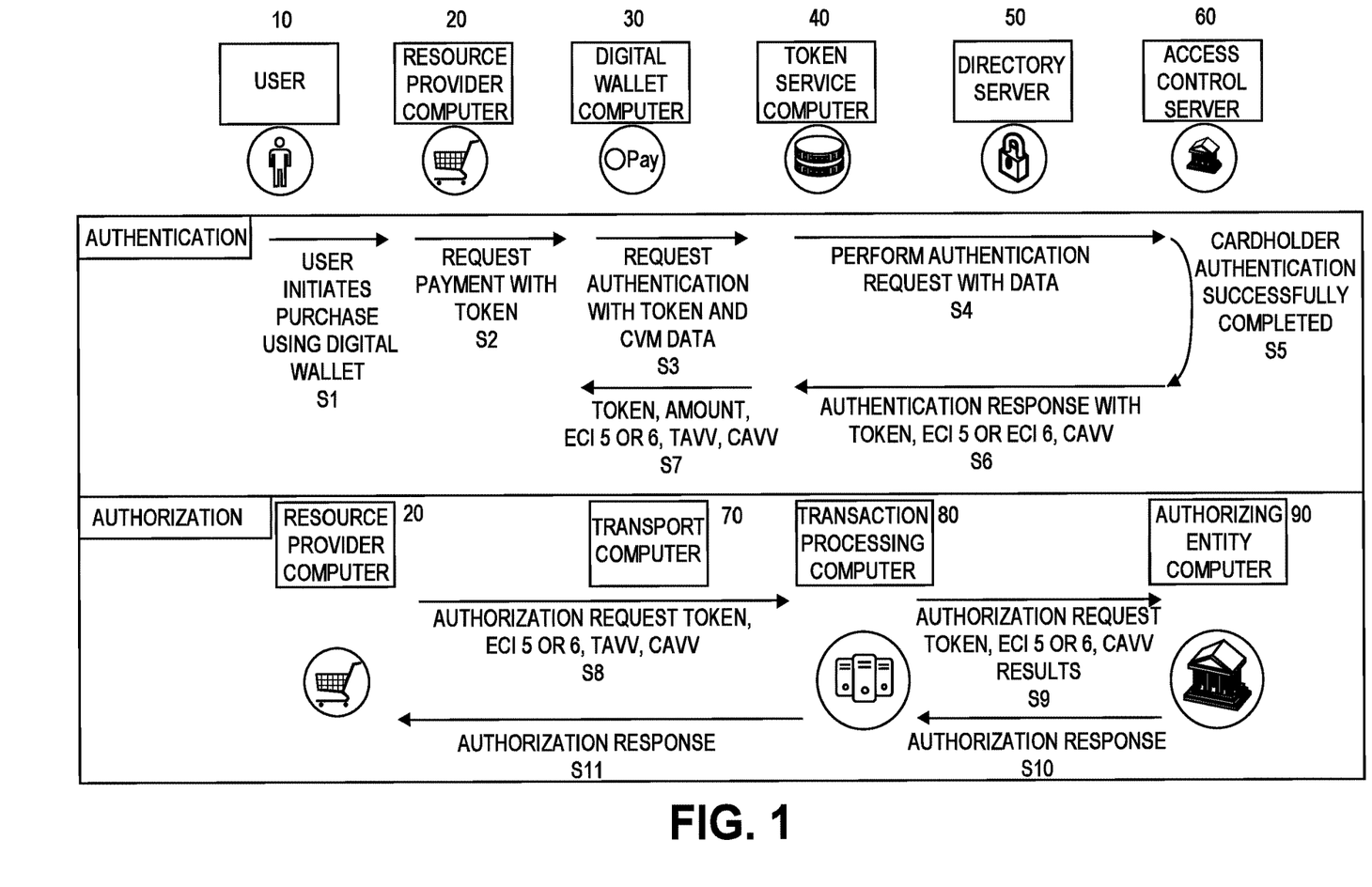
FIG. 1 shows a system and process according to an embodiment of the invention.

FIG. 1 shows a process flow and system according to an embodiment of the invention. The system includes a user 10, who can interact with an resource provider computer 20 such as an online merchant. The resource provider computer 20 may be in communication with a digital wallet computer 30, a token service computer 40, a directory server 50, and an access control server 60. In some embodiments, the access control server may be operated by a payment processing network that operates the token service computer 40.

Figure 2:
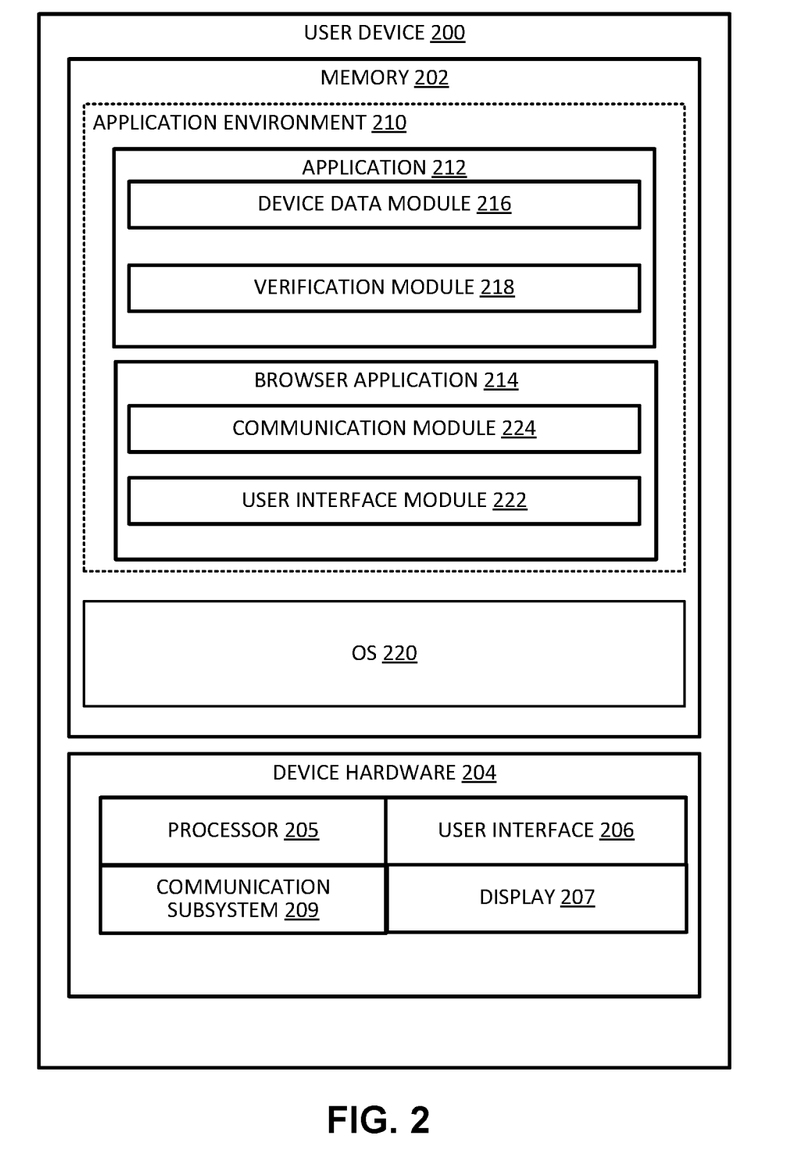
FIG. 2 shows a block diagram of a user device.

As illustrated in FIG. 1, the user 10 may utilize a user device (not pictured) to conduct a transaction with resource provider computer 20. The transaction may include an authentication process and an authorization process to complete the transaction. During the authentication process, the user may interact with a digital wallet (application) on the user device and a resource provider application (browser application) as illustrated in FIG. 2 below to conduct the transaction and provide verification method data as well as authentication data to authenticate themselves (the user 10) or the associated user device with the digital wallet, the digital wallet computer 30, or the access control server 60. In accordance with at least one embodiment, the user 10 may provide a password, answer a challenge question, or provide a biometric sample or biometric data stored on the user device as verification method data to the digital wallet or digital wallet computer 30 to authenticate themselves or the user device. As described below, steps S1-S7 describe the authentication process for the transaction initiated by the user 10.

In step S1, the user 10 can initiate a purchase with the resource provider computer 20 using a digital wallet or browser application, either on the user's 10 user device or at the resource provider computer 20.

In step S2, the resource provider computer 20 then generates an authentication request message including an access token (e.g., a payment token), and an optional transaction amount and transmits it to the digital wallet computer 30. In embodiments, the authentication request message may include transaction-specific information such as a user-specific data, device data, or data about the resource provider such as an identifier for the resource provider, item information, a geographic location for the resource provider, etc. In other embodiments, information needed to generate an authentication request message may be provided to the digital wallet computer 30 and the digital wallet computer 30 may generate the authentication request message.

In step S3, the digital wallet computer 30 then transmits the authentication request message to the token service computer 40. The authentication request message may include the access token and verification method data (illustrated in FIG. 1 as CVM (cardholder verification method data)). The user 10 may be required to provide verification method data to the digital wallet computer 30 via the digital wallet to authenticate themselves and continue the authentication process for the transaction. For example, the user 10 may provide a password that the application compares with a stored password on a secure element of the user device in order to authenticate the user with the digital wallet and continue the authentication process. In cases where the verification method data does not match the stored or obtained verification method data, the digital wallet and/or the digital wallet computer 30 may decline to continue the authentication process and return an authentication response message which indicates that the user 10 or user device has not been authenticated.

In step S4, the token service computer 40 may transmit the authentication request message to the access control server 60 via a directory server 50. In embodiments, the directory server may use information included in the authentication request such as transaction data to identify the appropriate access control server 60 for authenticating the transaction. An appropriate routing table may be present in the directory server 50 for this purpose.

In step S5, and the access control server 60 may authenticate the user 10. This can be done by communicating with and inspecting the user device used by the user 10, or by transmitting a challenge request message to the user's 10 user device to input a credential such as a PIN or password. The access control server 60 may authenticate the user 10 based on the information included in the challenge response message. In embodiments, the access control server 60 may utilize the verification method data included in the authentication request message to authenticate the user 10. In such cases the access control server 60 may not request further authentication from the user 10 such as by transmitting a challenge request message. In some embodiments, the access control server 60 may utilize the user-specific data or the device data to authenticate to the user 10. In embodiments, the access control server 60 may compare the information or data included in the challenge response message to identify if it matches data stored by the access control server 60. If the data in the challenge response message matches the data stored by the access control server 60, then the user 10 or user device may be authenticated. The access control server 60 may generate a cardholder authentication verification value (CAVV) to indicate that the user 10 or user device have been verified by the access control server. As described in more detail with reference to FIG. 3, the directory server 50 and/or the access control server 60 may be configured to perform a risk analysis using the user-specific data or the device data included in the authentication request message. In embodiments, the directory server 50 and/or the access control server 60 may calculate a risk score for the transaction and utilize the risk score for determining whether to authenticate the user 10.

In step S6, the access control server 60 can generate and transmit an authentication response message back to the token service computer 40 via the directory server 50. The authentication response message may include the token, an ECI indicator (electronic commerce indicator) (illustrated in FIG. 1 as ECI 5 or ECI 6), and the CAVV. The CAVV may be a cryptogram that indicates that the access control server 60 has verified the user 10. In embodiments, the access control server 60 may decline to authenticate the transaction if it does not include an ECI indicator. The ECI indicator indicates that the current transaction is an electronic commerce transaction, as opposed to a transaction occurring at a physical point of sale.

In step S7, the token service computer 40 transmits the authentication response message to the resource provider computer 20 via the digital wallet computer 30. The token service computer 40 can add a token authentication verification value (TAVV) to the authentication response message. The TAVV may be a cryptogram that accompanies the token, and verifies the valid use of that token. In some embodiments, the TAVV and CAVV may be combined into one cryptogram by the token service computer 40. In such embodiments, since the token service computer 40 receives the CAVV from the access control server 60 and can generate the TAVV, it may also combine these two pieces of information to form a new cryptogram.

The new cryptogram many be generated in any suitable manner, and may have the same number of digits as the CAVV or the TAVV. For example, the CAVV and the TAVV may be combined by performing a secret algorithm that uses one or more mathematical operations that is only known to the token server computer and a transaction processing computer.

If a new cryptogram is formed from the CAVV and the TAVV, this new cryptogram may be transmitted back to the resource provider computer 20 for use in the authorization request message during the authorization process described below in steps S8-S11. This advantageously saves on the space needed in the authorization request message. For example, a conventional authorization request message may only have one data field that can hold a three digit CAVV, and may not be able to hold a TAVV. The new cryptogram can be placed in the data field that would hold the CAVV, but would include information about the CAVV and the TAVV. In addition, certain resource provider computers may utilize a message format that is not configured to receive and process two different authentication verification values such as the TAVV and CAVV as separate cryptograms. In such cases, the token service computer 40 may combine the TAVV and CAVV into a new and singular cryptogram that can be received and processed by the resource provider computer 20 during the authorization process. In other embodiments, both the TAVV and the CAVV may be passed back to the digital wallet computer 30 in step S7.

As illustrated in FIG. 1, once the user 10 is authenticated, an authorization process can be performed via the resource provider computer 20, the transport computer 70, the transaction processing computer 80, and the authorizing entity computer 90.

In step S8, the resource provider computer 20 may transmit an authorization request message to a transaction processing computer 80 via the transport computer 70. In some embodiments, the transaction processing computer 80 may include the token service computer 40. The transaction processing computer 80 may be configured to validate the TAVV and CAVVs, and may optionally de-tokenize the access token to identify a real account identifier. The authorization request message may include the transaction amount, the token, the electronic commerce indicator, the TAVV, and the CAVV (or the cryptogram that includes both the TAVV and the CAVV). In embodiments, the transaction processing computer 80 may decline to validate the TAVV and CAVVs absent an ECI. If the ECI is not present and the TAVV is specifically associated with an electronic commerce transaction, then the token that is being used may be used outside of its authorized domain and the transaction may be declined.

In some embodiments, if the TAVV and the CAVV are present in a single cryptogram, then the TAVV and the CAVV can be recovered using an appropriate algorithm from the single cryptogram. The TAVV and the CAVV can then be verified by the transaction processing computer 80. It is noted that the transaction processing computer 80 may be token server computer 40 to receive information regarding the TAVV and the CAVV prior step S8.

In step S9, the transaction processing computer 80 may transmit the authorization request message to the authorizing entity computer 90, and the authorizing entity computer 90 may make an authorization decision. In embodiments, the authorizing entity computer 90 may utilize the information included in the authorization request message such as the TAVV, CAVV, or other information to authorize the transaction.

In step S10, the authorizing entity computer 90 may generate and transmit an authorization response message to the transaction processing computer 80. The authorization response message may indicate that the transaction is or is not authorized by the authorizing entity computer 90.

In step S11, the transaction processing computer 80 may transmit the authorization response message to the resource provider computer 20. Prior to doing so, however, the transaction processing computer 80 may communicate with the token service computer 40 to exchange the real account identifier for the token that was included in the initial authorization request message.

At the end of the day or at any other suitable period of time, the transaction can be cleared and settled via associated acquirers and issuers.

FIG. 2 shows a block diagram of a user device 200 according to embodiments of the present invention. User device 200 may be used to implement user device utilized by user 10 of FIG. 1 to conduct a transaction, for example. User device 200 may include device hardware 204 coupled to a memory 202. Device hardware 204 may include a processor 205, a communications subsystem 209, and a user interface 206. In some embodiments, device hardware 204 may include a display 207 (which can be part of user interface 206). Processor 205 can be implemented as one or more integrated circuits (e.g., one or more single core or multicore microprocessors and/or microcontrollers), and is used to control the operation of user device 200. Processor 205 can execute a variety of programs in response to program code or computer-readable code stored in memory 202, and can maintain multiple concurrently executing programs or processes. Communications subsystem 209 may include one or more RF transceivers and/or connectors that can be used by user device 200 to communicate with other devices and/or to connect with external networks. User interface 206 can include any combination of input and output elements to allow a user to interact with and invoke the functionalities of user device 200. In some embodiments, user interface 206 may include a component such as display 207 that can be used for both input and output functions.

Memory 202 can be implemented using any combination of any number of non-volatile memories (e.g., flash memory) and volatile memories (e.g., DRAM, SRAM), or any other non-transitory storage medium, or a combination thereof media. Memory 202 may store an operating system (OS) 220 and an application environment 210 where one or more applications reside including application 212 and browser application 214 to be executed by processor 205.

Application 212 can include an application that collects device data. Application 212 may include a device data module 216 and verification module 218. Device data module 216, working in conjunction with the processor 205, may collect data relating to user device 200, such as device type, operating system, IP address, browser information, etc. Device data module 216 may be invoked upon accessing a particular resource identifier (e.g., URL) and/or by executing particular code.

The user 10 may operate user device 200 to perform any number of functions that the user device 200 are configured to perform. For example, the user 10 may use user device 200 to conduct remote transactions by communicating with resource provider computer 20 and digital wallet computer 30. The resource provider computer 20 may deliver available products and services to the browser application 214 which the user 10 may interact with via user interface module 222, user interface 206, and display 207 to initiate a remote transaction whether located at a resource provider location or remote from the resource provider. The browser application 214 may be a resource provider-specific application. In other embodiments, the browser application 214 may be a general purpose application, such as a web browser. Further, the browser application 214 may be associated with parties that are not resource providers and instead process payments on behalf of merchants or other service providers (e.g., payment service providers, acquirers, etc.). In embodiments, a communication module 224 may be configured to communicating with resource providers to obtain information such as interface elements for offering services or products. The user interface module 222, the user interface 206, and display 207 may be configured to generate and display or present resource provider products or services which the user may interact with via user device 200 to initiate a transaction.

The application 212 may be stored in a secure memory of the user device 200 and memory 202. The application 212 may be configured to securely access personalized sensitive information (e.g., payment credentials, tokens, account identifiers, etc.) associated with a user's financial account. The application 212 may include any application programming interface (API), service, application, applet, or other executable code suitable to retrieve payment information a secure stored module or secure element and communicate with browser application 214, a resource provider computer 20, and/or a digital wallet computer 30. The application 212 may include a certificate associated with digital wallet computer 30 and/or token service computer 40 which may be used to encrypt payment information and other communications using a public key associated with token service computer 40 or digital wallet computer 30. In embodiments, the application 212 may be operable to generate cryptograms associated with the payment information. In embodiments, the application 212 may be configured for generating authentication requests.

In embodiments, the verification module 218 may be configured to authenticate or verify the user 10 interacting with user device 200 or application 212 prior to generating an authentication request message. For example, the user device 200, application 212, verification module 218, and user interface 207 and display 207 may be configured to query the user for verification method data that can be matched or verified against information stored in memory 202 by application 212 or by communicating with digital wallet computer 30. In embodiments, the verification method data may include a response by a user interacting with user device 200 to provide a PIN, a password, or biometric information. The application 212 may be configured for generating an authentication request for a transaction conducted by user 10 utilizing user device 200 that includes a token generated by the application 212 and the verification method data. In embodiments, the authentication request may be generated by the application 212 or by the digital wallet computer 30 that is in communication with the application 212 of user device 200.

Figure 3:
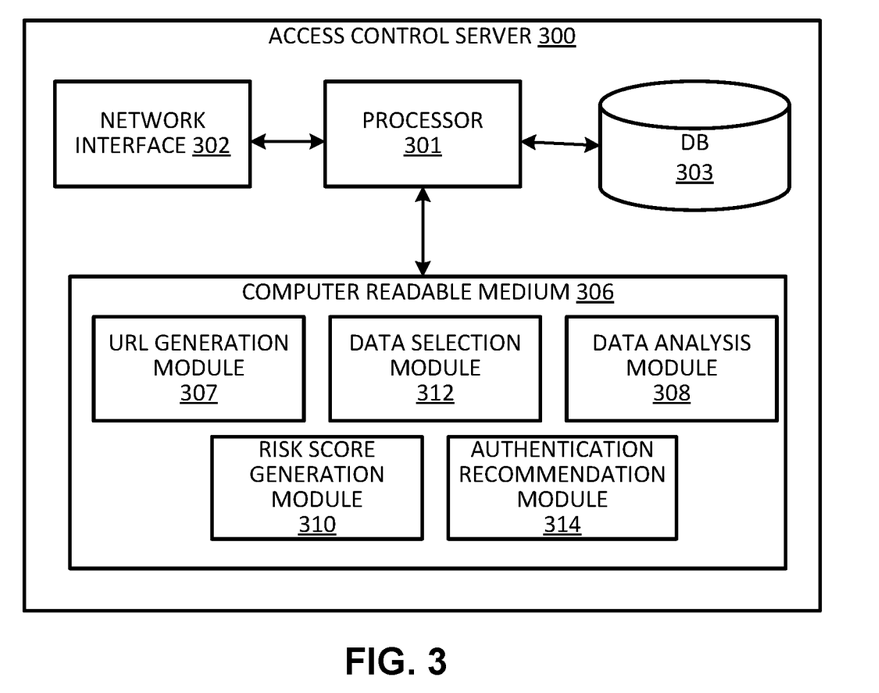
FIG. 3 shows a block diagram of an access control server.

FIG. 3 shows a block diagram of an access control server 300 according to embodiments of the present invention.

Access control server 300 may include a processor 301 coupled to a network interface 302, a database 303, and a computer readable medium 306. Processor 301 may include one or more microprocessors to execute program components for performing the various functions of access control server 300. Network interface 302 may be configured to connect to one or more communication networks to allow access control server 300 to communicate with other entities. Computer readable medium 306 may include any combination of one or more volatile and/or non-volatile memories, for example, RAM, DRAM, SRAM, ROM, flash, or any other suitable memory components. Computer readable medium 306 may store code executable by the processor 301 for implementing some or all of the functions of access control server 300 described herein. For example, computer readable medium 306 may include a URL generation module 307, a data analysis module 708, a risk score generation module 310, a data selection module 312, and/or an authentication recommendation module 314.

URL generation module 307 may, in conjunction with the processor 301, generate a URL (or other resource identifier) that will allow access control server 300 to collect device data or user-specific data. The URL may point to a website containing embedded code that, when executed on user device 200, collects device data of user device 200. The device data can then be transmitted back to access control server 300 for use in authenticating a transaction in conjunction with the processor 301. In embodiments, the URL may point to a website containing embedded code that, when executed on user device 200, includes a challenge request message. The user may interact with user device 200 to respond to the challenge request message such as by providing a password, a PIN, or biometric data. The access control server 300 may receive a challenge response message from the user device via the URL generation module 307 and network interface 302.

Data selection module 312 may, in conjunction with the processor 301, select which type(s) of third party data to request from third parties to supplement the collected user-specific data and device data. In one embodiment, the type(s) of third party data selected is based on the user specific-data and/or the device data received. Alternatively or additionally, the type(s) of third party data selected is based on a schema for authentication associated with a data provider. For example, the schema may specify that the data provider only wants to consider credit score data. In this example, any additional data (outside of the credit score data) that is received from third parties may be ignored. In another example, no additional data (outside of the credit score data) will be requested.

Data analysis module 308 may, in conjunction with the processor 301, aggregate and analyze the user-specific data, the device data, any other suitable data included in a challenge response message, the verification method data, and/or the third party data. For example, data analysis module 308 may, in conjunction with the processor 301, access fixed risk data tables and/or dynamic risk data.

Risk score generation module 310 may, in conjunction with the processor 301, generate a risk score based on the output of data analysis module 308. For example, risk score generation module 310 may assign a numerical value to a user's request for a data service or a consumer's request for a payment transaction (e.g., 0 to 100, with 100 being the highest risk), based on the available risk data. In another example, risk score generation module 310 may assign a letter value to the user's request (e.g., A to F, with F being the highest risk), based on the risk data. In still another example, risk score generation module 310 may assign a word or phrase to the user's request (e.g., "high risk", "moderate risk", "low risk", etc.). However, it is contemplated that any scale or indicator may be implemented by risk score generation module 310.

Authentication recommendation module 314 may, in conjunction with the processor 301, generate a recommended response for the data provider to make to the user device, or digital wallet computer requesting the data service. The recommended response may recommend whether the data provider should allow the user device to access the requested data service, based on the output of risk score generation module 310.

For example, if the generated risk score indicates that the user's request for a data service is high risk, authentication recommendation module 314 may, in conjunction with the processor 301, generate a recommendation that the request be denied. In another example, if the generated risk score indicates that the user's request for a data service is low risk, authentication recommendation module 314 may, in conjunction with the processor 301, generate a recommendation that the request be allowed.

In one embodiment, if the generated risk score indicates that the user's request is moderate risk, other data may be considered in conjunction with the risk score prior to making a recommendation. In one embodiment, the sensitivity or confidentiality of the underlying data or data service being requested may be considered. For example, authentication recommendation module 314 may, in conjunction with the processor 301, recommend that a moderate risk request be denied if the requested data contains social security numbers, payment account numbers, etc. In an additional or alternative embodiment, authentication recommendation module 314 may, in conjunction with the processor 301, recommend that further authentication processing be performed for a moderate risk request.

Similarly, authentication recommendation module 314 may, in conjunction with the processor 301, generate a recommended response for a resource provider to a user requesting a transaction based on the output of the risk score generation module 310. In embodiments, the authentication recommendation module 314 in conjunction with the processor 301, may generate a CAVV and an authentication response message that is transmitted to the digital wallet computer 30 indicating that the user 10 is authenticated or verified for the transaction. In embodiments, the authentication response message may include the token, an ECI, and the CAVV.

Figure 4:
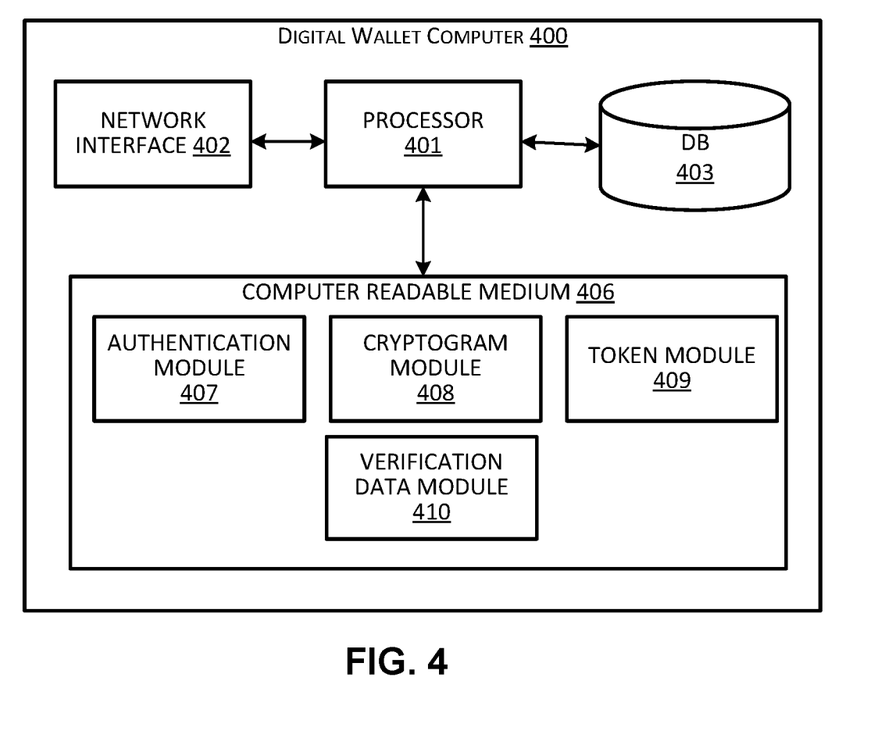
FIG. 4 shows a block diagram of a digital wallet computer.

FIG. 4 shows a block diagram of a digital wallet computer according to an embodiment.

Digital wallet computer 400 may include a processor 401 coupled to a network interface 402, a database 403, and a computer readable medium 406. Processor 401 may include one or more microprocessors to execute program components for performing the various functions of digital wallet computer 400. Network interface 402 may be configured to connect to one or more communication networks to allow digital wallet computer 400 to communicate with other entities such as a user device associated with user 10, resource provider computer 20, and token service computer 40. Computer readable medium 406 may include any combination of one or more volatile and/or non-volatile memories, for example, RAM, DRAM, SRAM, ROM, flash, or any other suitable memory components. Computer readable medium 406 may store code executable by the processor 401 for implementing some or all of the functions of digital wallet computer 400 described herein. For example, computer readable medium 406 may include an authentication module 407, a cryptogram module 408, a token module 408, and verification data module 410.

The authentication module 407 may be configured, in conjunction with processor 401, for generating an authentication request message for a transaction conducted by a user (user 10) utilizing a user device and including a resource provider such as resource provider computer 20. The authentication request message generated by the authentication module may include a token and verification method data obtained from the verification data module 410.

The cryptogram module 408 may be configured, in conjunction with processor 401, for generating a new cryptogram that includes both the CAVV and TAVV received from the access control server 60 and token service computer 40. In embodiments, the cryptogram module 408 may generate the new cryptogram that includes the CAVV and TAVV based on an indication of a message format supported by resource provider computer 20. For example, the resource provider computer 20 may be configured to utilize a message format that can process a single cryptogram at a time, such as a CAVV or a TAVV separately but not when provided as separate cryptograms. As such, the newly generated cryptogram that includes both the CAVV and TAVV may be utilized by resource providers who are configured to interact with and process a singular cryptogram during an authorization or authentication process.

The token module 409 may be configured, in conjunction with processor 401, to communicate with the token service computer 40 to request or generate a token for the personal account number or other sensitive information included in the transaction associated with the authentication request as illustrated in FIG. 1. In embodiments, the token module 409 may be configured to receive the TAVV from the token service computer 40. The token module 409 may be configured to include a token with the authentication request message that is provided to the token service computer and access control server as illustrated in FIG. 1.

The verification data module 410 may be configured, in conjunction with processor 401, to request verification method data from a user, such as user 10, who is conducting a transaction. The verification data module 410 may generate and transmit a request that is received and presented by user device 200 to user 10 and requests verification method data such as a PIN, a password, or biometric data to authenticate the user 10 or user device 200 with the digital wallet application or digital wallet computer prior to transmitting the authentication request message. In embodiments, the verification data module 410 may compare the verification method data provided by a user to stored data to identify a match and authenticate the user 10 to utilize the digital wallet application of the user device 200. In embodiments, the verification data module 410 may include the verification method data (e.g., the particular verification method utilized by the user 10 and the data provided by the user 10 in response to receiving the verification method request) in the authentication request that is transmitted to the token service computer 40 and access control server 60.

Figure 5:
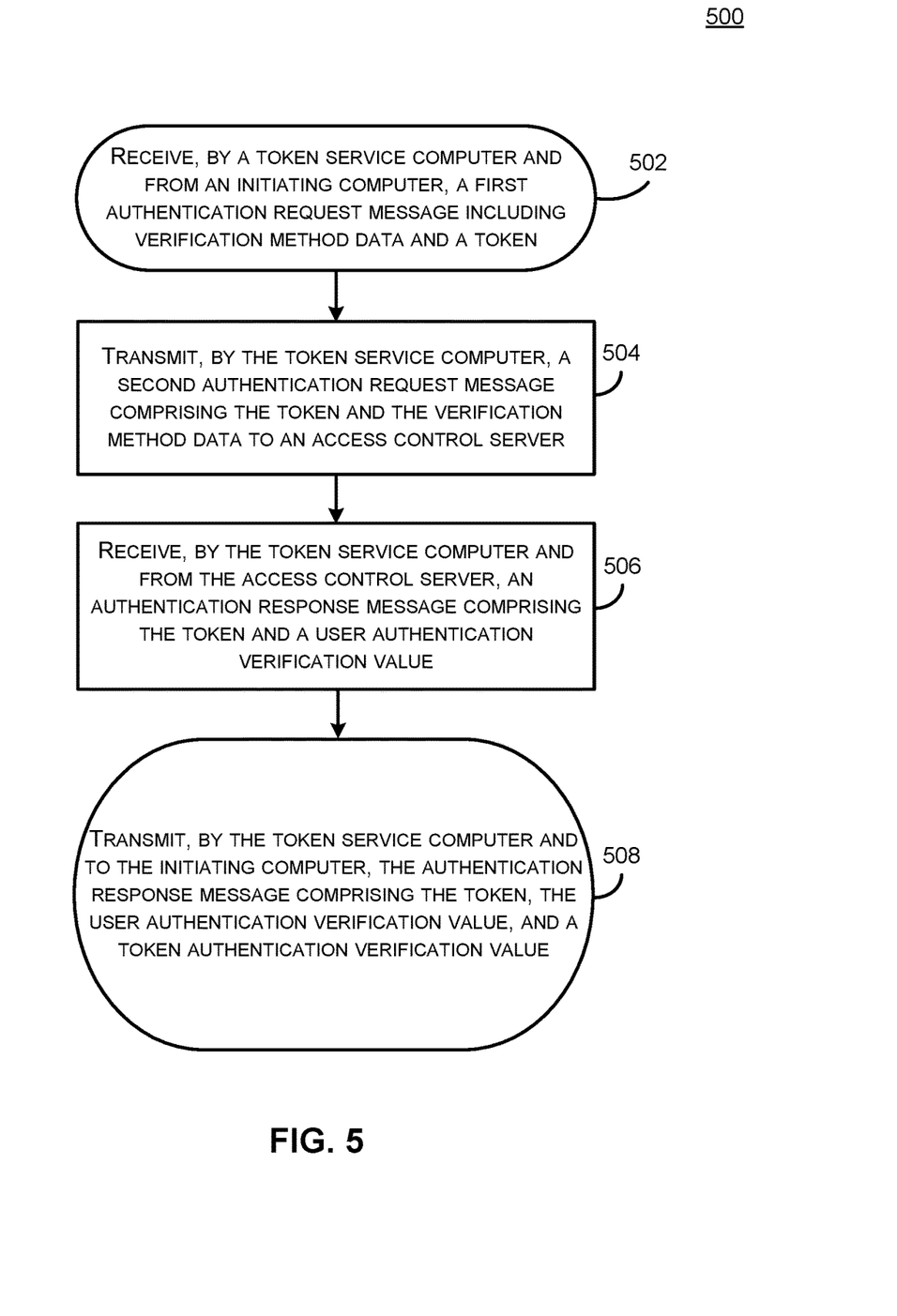
FIG. 5 shows a flowchart illustrating a method according to an embodiment of the invention.

FIG. 5 shows a flowchart illustrating a method according to an embodiment of the invention. FIG. 5 illustrates process 500 which can be performed by a token service computer illustrated in FIG. 1.

Process 500 may begin by receiving, by a token service computer and from an initiating computer, a first authentication request message including verification method data and a token at 502. In embodiments, the initiating computer may be a resource provider computer or a digital wallet computer. The process 500 may include transmitting, by the token service computer, a second authentication request message comprising the token and the verification method data to an access control server at 504. In embodiments, the second authentication request message may be transmitted to the access control server via a directory server. In embodiments, the verification method data may correspond to data obtained by the digital wallet computer and include authentication data or other suitable data utilized by the digital wallet computer or a digital wallet application of the user device to authenticate the user with the digital wallet application or digital wallet computer. The verification method data may include the process by which the user verified themselves (e.g., PIN, password, etc.,) but also the data provided (e.g., the specific PIN or password).

The process 500 may include receiving, by the token service computer and from the access control server, an authentication response message comprising the token and a cardholder authentication verification value at 506. In embodiments, the cardholder authentication verification value may indicate that the user or user device has been authenticated or verified by the access control server for the transaction. In embodiments, the access control server may generate and transmit a challenge request message to a user device associated with the user conducting a transaction. The access control server may authenticate the user based on the authentication data included in the challenge response message. For example, the challenge request message may request that the user provide a secure data element such as a password or biometric sample to authenticate themselves with the access control server in the challenge response message. In embodiments, the access control server may not generate and transmit the challenge request message but instead authenticate the user based on the data included in the second authentication request message including the verification method data or data about the device, the transaction, or applications of the device. The access control server may authenticate the user or user device based on data from one or more third parties. The process 500 may include transmitting, by the token service computer and to the initiating computer, the authentication response message comprising the token, the cardholder authentication verification value, and a token authentication verification value at 508. In embodiments, the token service computer may generate a new cryptogram that includes the cardholder authentication verification value and the token authentication verification value. The cryptogram can be utilized by resource providers who are not configured to receive and process different cryptograms separately.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents. It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software. Any of the software components or functions described in this application, may be implemented as software code to be executed by a processor using any suitable computer language such as, for example, Java, C, C++, Python or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

A recitation of "a", "an" or "the" is intended to mean "one or more" unless specifically indicated to the contrary. Reference to a "first" component does not necessarily require that a second component be provided. Moreover reference to a "first" or a "second" component does not limit the referenced component to a particular location unless expressly stated.

What is claimed is:

1. A method, comprising:
receiving, by a token service computer and from an initiating computer, a first authentication request message including verification method data and a token, the token service computer configured to generate tokens and maintain a mapping of the tokens to primary account numbers stored in a token vault, the verification method data representing authentication with a digital wallet computer by a user or a user device associated with the user, the token serving as a substitute for a primary account number of the primary account numbers;
transmitting, by the token service computer and via a directory server, a second authentication request message comprising the token and the verification method data to an access control server, the access control server configured to authenticate the user or the user device;
receiving, by the token service computer from the access control server via the directory server, an authentication response message comprising the token and a user authentication verification value, the user authentication verification value representing authentication of the user or the user device by the access control server;
generating, by the token service computer, a cryptogram that includes a token authentication verification value combined with the user authentication verification value, the token authentication verification value verifying valid use of the token; and
transmitting, by the token service computer to the initiating computer, the authentication response message comprising the token and the cryptogram.

2. The method of claim 1, wherein the initiating computer is the digital wallet computer or a resource provider computing device associated with a resource providing entity that corresponds to the first authentication request message.

3. The method of claim 1, wherein the initiating computer is a resource provider computer or the digital wallet computer, and wherein the token service computer is in communication with a transaction processing computer, and wherein the method further comprises:
receiving, by the transaction processing computer and from the resource provider computer, an authorization request message comprising a transaction amount, the token, and the cryptogram;
validating, by the transaction processing computer, the user authentication verification value and the token authentication verification value of the cryptogram;
modifying, the authorization request message to include a real account identifier associated with the token;
transmitting, by the transaction processing computer, the authorization request message comprising the real account identifier to an authorizing entity computer for authorization;
receiving, by the transaction processing computer and from the authorizing entity computer, an authorization response message; and
transmitting, by the transaction processing computer, the authorization response message to the resource provider computer.

4. The method of claim 1, wherein the verification method data includes authentication data obtained from the user device interacting with the initiating computer.

5. The method of claim 4, wherein the access control server is configured to authenticate the user device and generate the user authentication verification value based at least in part on the verification method data.

6. The method of claim 1, wherein token service computer receives user-specific data and user computing device data from a digital wallet computer or the initiating computer via the user device associated with the first authentication request message.

7. The method of claim 6, wherein the access control server authenticates the user device and generates the user authentication verification value based at least in part on one or more of the user-specific data or the user computing device data.

8. The method of claim 1, wherein the access control server declines to authenticate the second authentication request message based at least in part on an absence of an electronic commerce indicator included in the second authentication request message.

9. The method of claim 1, wherein the access control server is configured to generate and transmit a challenge request message to the user device associated with the first authentication request message or the digital wallet computer in response to receiving the second authentication request message.

10. The method of claim 9, wherein the access control server authenticates the user device and generates the user authentication verification value based at least in part on a challenge response message received from the user device or the digital wallet computer.

11. A computer system comprising:
a processor; and
a memory element including instructions that, when executed with the processor, cause the computer system to at least:
receive, from an initiating computer, a first authentication request message including verification method data and a token, the computer system configured to generate tokens and maintain a mapping of the tokens to primary account numbers stored in a token vault, the verification method data representing authentication with a digital wallet computer by a user or a user device associated with the user, the token serving as a substitute for a primary account number of the primary account numbers;
transmit, via a directory server, a second authentication request message comprising the token and the verification method data to an access control server, the access control server configured to authenticate the user or the user device;
receive, from the access control server and via the directory server, an authentication response message comprising the token and a user authentication verification value, the user authentication verification value representing authentication of the user or the user device by the access control server;
generate a cryptogram that includes a token authentication verification value combined with the user authentication verification value, the token authentication verification value verifying valid use of the token; and
transmit, to the initiating computer, the authentication response message comprising the token and the cryptogram.

12. The computer system of claim 11, wherein the verification method data includes authentication data obtained from the user device interacting with the initiating computer.

13. The computer system of claim 12, wherein the access control server is configured to authenticate the user device and generate the user authentication verification value based at least in part on the verification method data.

14. The computer system of claim 11, wherein the instructions when executed with the processor further cause the computer system to at least receive user- specific data and user computing device data from the digital wallet computer or the initiating computer via the user device associated with the first authentication request message.

15. The computer system of claim 14, wherein the access control server authenticates the user device and generates the user authentication verification value based at least in part on one or more of the user-specific data or the user computing device data.

16. The computer system of claim 11, wherein combining the token authentication verification value and the user authentication verification value into the cryptogram is based at least in part on a message format supported by the initiating computer.

17. The computer system of claim 11, wherein the access control server declines to authenticate the second authentication request message based at least in part on an absence of an electronic commerce indicator included in the second authentication request message.

* * * * *